United States Patent
Smith

[11] 3,772,611
[45] Nov. 13, 1973

[54] WAVEGUIDE GAS LASER DEVICES

[75] Inventor: Peter William Smith, Colts Neck, N.J.

[73] Assignee: Bell Telephone Laboratories, Incorporated, Murray Hill, N.J.

[22] Filed: Dec. 27, 1971

[21] Appl. No.: 212,605

[52] U.S. Cl.......................... 331/94.5 C, 350/96 WG
[51] Int. Cl................................................ H01s 3/00
[58] Field of Search..................... 330/4.3; 331/94.5; 350/96 WG

[56] References Cited
UNITED STATES PATENTS

| | | | |
|---|---|---|---|
| 3,386,043 | 5/1968 | Marcatili | 330/4.3 |
| 3,538,453 | 11/1970 | Miller | 331/94.5 |
| 3,566,302 | 2/1971 | Rhodes | 331/94.5 |
| 3,609,587 | 9/1971 | Kolb, Jr. | 331/94.5 |
| 3,683,300 | 8/1972 | Hohenstein | 331/94.5 |
| 3,614,198 | 10/1971 | Martin et al. | 331/94.5 |

FOREIGN PATENTS OR APPLICATIONS

| | | | |
|---|---|---|---|
| 1,344,970 | 10/1963 | France | 331/94.5 |

OTHER PUBLICATIONS

Basov et al., Optics & Spectroscopy 15, (3), September 1963, pp. 235–236.

*Primary Examiner*—David Schonberg
*Assistant Examiner*—R. J. Webster
*Attorney*—W. L. Keefauver

[57] ABSTRACT

There are disclosed gas lasers in which the light is guided by a hollow dielectric waveguide which also serves to confine the discharge. These lasers are typically designed to have resonators with Fresnel numbers small enough (less than ~0.5) to suppress the dominant free space mode and having sufficient gain for a waveguide mode of oscillation to exist. Each laser has an internal resonator structure and is designed in such a way that the electrical excitation of the gas discharge can be accomplished without interfering with the light guiding properties of the waveguide. Several novel techniques for forming waveguide laser tubes of the required small dimensions are also disclosed. The embodiments include a capillary ring-type configuration that is r.f.-excited, a distributed feedback configuration using periodic changes in waveguide bore cross section, or wall index of refraction, and various rectangular waveguide configurations, for example, two flat glass plates spaced at the edges by two thin-film strips.

3 Claims, 5 Drawing Figures

SMOOTH PERIODIC SURFACE CONTOUR OR INDEX VARIATIONS

PATENTED NOV 13 1973 3,772,611

WAVEGUIDE GAS LASER DEVICES

BACKGROUND OF THE INVENTION

This invention relates to gas lasers in which the light is guided by a hollow dielectric waveguide which also serves to confine the discharge. Such lasers are designed so that a waveguide mode oscillates to the exclusion of free space modes.

In U.S. Pat. No. 3,386,043, issued May 28,1968, it is shown that a waveguide mode of oscillation can exist in a dielectric capillary tube, even though the central core filled with gas has a lower index of refraction than its surroundings. For this mode of oscillation to be established, the dominant free space mode must be cut off. Most broadly, the bore diameter $a$ should be less than $b^2$ times $\lambda$, where $b$ is the single pass length of the resonator and $\lambda$ is the wavelength of the intended oscillation. Since the ratio $a/b^2\lambda$ is known as the Fresnel number, it is seen that a low Fresnel number is required for this type of gas laser.

Nevertheless, it has been found that several other conditions are desirable for the operation of waveguide gas lasers. For example, in my article in *Applied Physics Letters*, Vol. 19, page 132 (1971), I show that the use of a combination of r.f.- and dc-excitations is desirable for achieving oscillation threshold without characteristic plasma instabilities.

Although high gains per unit length have been obtained with waveguide gas lasers employing Brewster-angle windows, configurations providing improved gain, efficiency, compactness and utility are desirable.

SUMMARY OF THE INVENTION

According to my invention, improved waveguide gas lasers employ various internal-mirror configurations that advantageously provide a minimum of interference between the optical resonator and the electrical discharge pumping means. It is found that extremely small laser lengths, perhaps as small as a fraction of a centimeter, may now be practical.

As a further feature of my invention, I have determined that such lasers can be made entirely without conventional reflectors of the type used in gas lasers and that, instead, the resonator may be formed by means of a continuous ring-like path or by a distributed-feedback type of reflector.

BRIEF DESCRIPTION OF THE DRAWING

Other features and advantages of my invention will become apparent from the following detailed description, taken together with the drawing, in which.

DESCRIPTION OF ILLUSTRATIVE EMBODIMENTS

Figure 1:
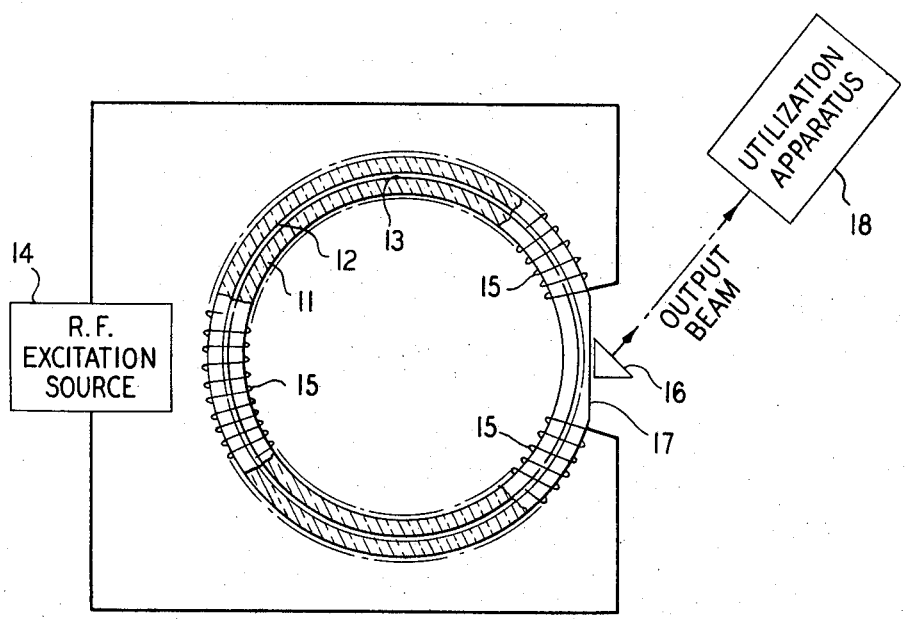
FIG. 1 is a partially pictorial and partially block diagrammatic illustration of a ring-type embodiment of the invention.

In the embodiment of FIG. 1, waveguide gas laser oscillation is achieved in the mirrorless configuration including the ring-type capillary tube 11 having a smooth wall 13 on its inner bore and an active gas 12 filling that bore. The tube 11, by closing on itself, forms a ring resonator. It is pumped purely by the r.f.-excitation from the source 14 supplied through the coil 15, or electrodes spaced along the tube in conventional manner. An output beam for use in the utilization apparatus 18 is illustratively extracted from the ring-type laser by a prism 16 separated by a small gap from the flat portion 17 of the tube wall. This prism couples the waveguide mode to a free space beam via the evanescent fields extending into the prism.

For best operation of an embodiment like that of FIG. 1, I suggest the use of a high-gain laser transition such as the 3.5 micrometer helium xenon laser line. A relatively high-gain transition seems desirable for rings of diameters between about 10 centimeters and a meter because the radiation losses through the evanscent field of the waveguided laser radiation with such continuous curvature are appreciable. Nevertheless, the absence of mirrors may make such a ring laser useful for rotation rate sensing, as the mirror scattering coupling effects (which limit the performance of conventional ring laser rotation rate sensors) are avoided.

DC-excitation is desirable for waveguide gas lasers which are to have a shorter pathlength or which are to use somewhat lower-gain media. It should be noted that waveguide gas lasers with shorter pathlengths may be of interest in integrated optical circuits of various proposed types.

Figure 2:
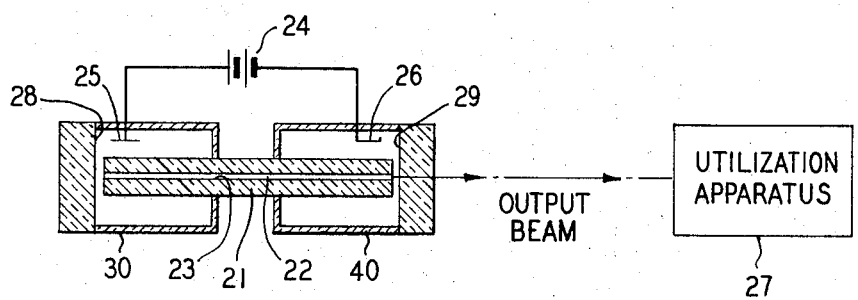
FIG. 2 is a partially pictorial and partially schematic illustration of a second embodiment of the invention.

In order to use dc-excitation in the embodiment of FIG. 2, the mirrors are illustratively spaced a small distance from the waveguide to allow a dc discharge path. The embodiment of FIG. 2 specifically includes the capillary tube 21 which, illustratively, may have an internal diameter of about 0.017 of an inch and a length of 5 centimeters. The gaps between the ends of capillary tube 21 and the reflective surfaces 28 and 29 supported by outer containers 30 and 31 should be of the order of, or less than the bore of, the waveguide in order to avoid appreciable diffraction loss. The outer containers 30 and 31 make contact with tube 21 relatively near to its center and enclose not only the major portion of the gas volume, but also the anode 25 and the cathode 26 near respective ends of tube 21. The dc-excitation source 24 is illustrativey connected in appropriate polarity between anode 25 and cathode 29 in order to supply a discharge through the gas. The reflective surface 29 is made partially transparent to extract an output beam for use in utilization apparatus 27. The Fresnel number of the laser of FIG. 2 is typically less than about 0.5; and, for the case in which only dc-excitation is used, as shown, the resonator length is short enough to avoid plasma instability in the active gas, here illustratively a helium-neon mixture.

Figure 3:
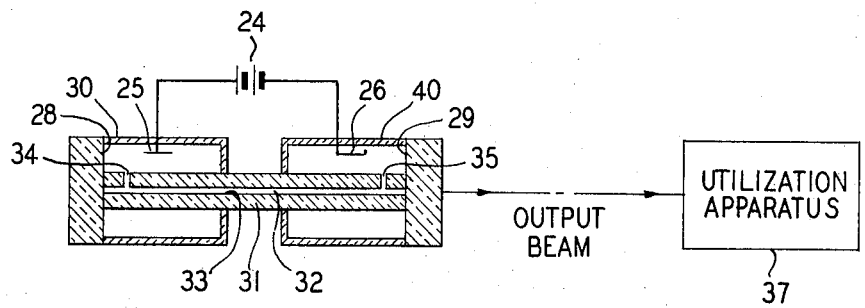
FIGS. 3 and 4 show modifications of the embodiment of FIG. 2.

Because an overly strong discharge in the embodiment of FIG. 2 may damage the reflective surfaces 28 and 29, the alternative arrangement of FIG. 3 may be provided. This arrangement is very similar to that of FIG. 2 except that the reflective surfaces are protected in that cuts transverse to the tube axis are made through one-half of the tube wall; for example, the cuts 34 and 35 spaced from reflective surfaces 28 and 29, respectively. The discharge between electrodes 25 and 26 passes through these cuts. Again, the Fresnel number of the waveguide section is preferably of the order of about 0.5 or less. The capillary tube 31 illustratively has an internal diameter of about 0.017 of an inch and the cuts 34 and 35 are about 0.014 of an inch along the tube axis. I have measured the loss of such a cut in a 0.017 inch-bore waveguide under passive conditions to be only about 0.5 percent, with no observable mode conversion.

Figure 4:
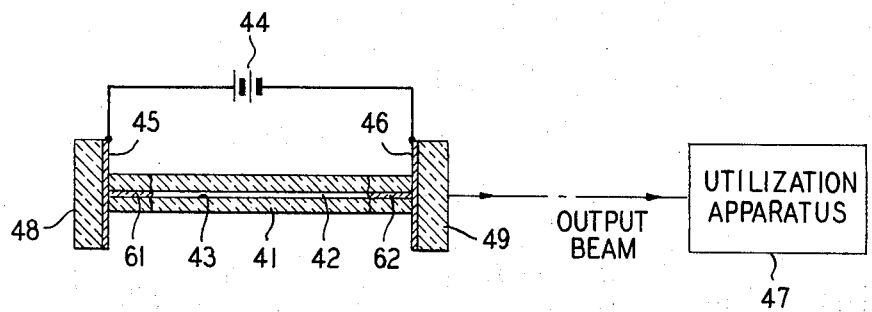

A further modification of the embodiment of FIG. 2 is shown in FIG. 4. This modification employs the reflectors 45 and 46 as the electrodes for the discharge and eliminates the need for the gaps. Therefore, the dc-excitation source 44 is connected between electrodes 45 and 46. The laser has a bore length and inner lateral dimension similar to those of FIG. 3. Gas mixtures such as helium-xenon or helium-neon, could be used, since metal is a good reflector at 3.5 micrometers, 3.39 micrometers, or other wavelengths in the infrared.

By way of illustration of another feature of the invention, the embodiment of FIG. 4 also assumes a rectangular cross section of the bore of the capillary tube 41. Thus, the tube 41 could consist of upper and lower flat plates spaced at the back and front edges by thin films 61 and 62, respectively, each of which extends the length of the tube and together define the lateral extent of the bore. Thus, the cross sections of the tube 41 in FIG. 4 are shown at three different depths in the tube to show its structure farthest from the viewer at the left, along its axis at the center, and nearest to the viewer at the right. This type of construction appears feasible since it is now within the stage of the art to make very flat surfaces on such glass plates and to deposit the dielectric thin films 61 and 62, illustratively of silicon dioxide, with very carefully controlled thicknesses and smooth edges.

The embodiment of FIG. 1 is not the only possible embodiment which eliminates the need for the lumped type of reflectors used in the other above-mentioned embodiments. As shown in the embodiment of FIG. 5, discrete or lumped reflectors are eliminated by smooth periodic variations in the inner surface contours of the capillary 51, thereby changing the bore diameter in a periodic fashion or by periodic index-of-refraction variations in the inner wall of the tube, as illustratively shown by the markings 54 and 55 in the embodiments of FIG. 5.

A theoretical analysis by D. Marcuse shows that, even in a waveguide gas laser in which the central medium has a lower index than its surroundings, each such variation will effectively reflect a small portion of the radiation. With a sufficient number of such periodic variations, a high proportion of the radiation can be reflected. In fact, the periodic variations 54 and 55 may be extended along the axis of tube 51 until they meet in the central portion of tube 51.

Figure 5:
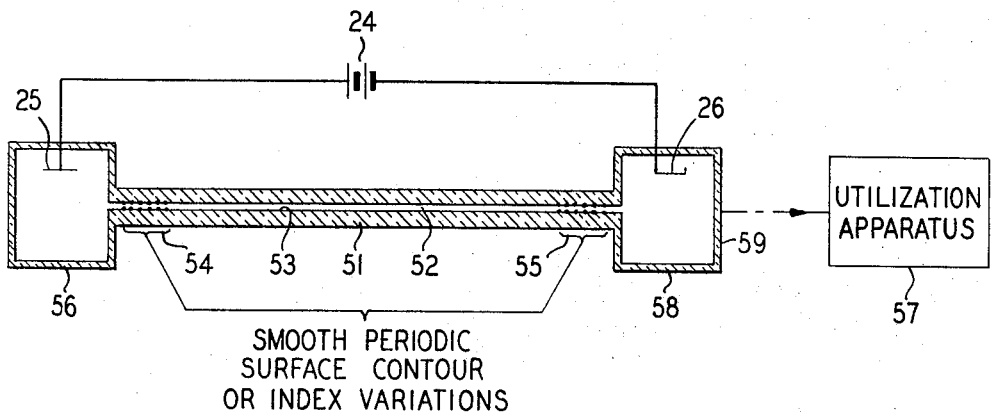
FIG. 5 is a partially pictorial and partially schematic illustration of an embodiment of the invention with distributed-feedback reflectors incorporated into the tube walls.

It will be noted in the embodiment of FIG. 5 that the anode 25 and the cathode 26 of the pumping arrangement can be disposed in the enlarged end containers 56 and 58 communicating with the bore of tube 51 without interfering with the action of the optical resonator. Such an excitation arrangement insures that the entire length of the gaseous active medium, in line with the bore of tube 51, is excited so that it will have a population inversion and thereby maximize gain.

Output coupling can be provided by reducing the total reflectivity of one of the sets of index variations, for example, the set 55, so that an output beam may be coupled through the end wall 59 of the laser through utilization apparatus 57. If desired, the end plate 59 can be disposed at the Brewster angle.

There should be other related techniques for insuring that the resonator will reflect the light in the waveguide mode without blocking the discharge and so that the discharge will not damage the resonator.

Still other modifications of the disclosed embodiments are possible. For example, rectangular cross section waveguides for such lasers could be made by sputtering a channel in a dielectric plate by a scanned electron beam or by using four polished flat glass strips to construct the embodiment of FIG. 4 instead of depositing the thin films 61 and 62 of the embodiment of FIG. 4 during the fabrication of the capillary. Still further, four such flat glass strips can be put together in such a way; specifically by abutting an edge of each to the flat surface of, say, its right-hand neighbor, so that no edge of a strip is exposed to the interior of the capillary waveguide. Therefore, no thin edges would have to be polished.

One particular application of a modification of the embodiment of FIG. 5 is as follows. Let us assume the reflectors 54 and 55 are omitted. Amplified spontaneous emission from a long amplifier can be used as a frequency standard. The high gain per unit length achievable with He-Xe at 3.5$\mu$m in a 100 $\mu$m hollow dielectric waveguide would narrow the spontaneous emission output to 3 percent of the Doppler linewidth in a 1 meter length of laser amplifier. If we could measure the center of the line to a precision of 1 percent of the output linewidth, this would correspond to a frequency standard with an accuracy of three parts in $10^{10}$.

I claim:

1. A gas laser comprising
  a capillary tube of bore diameter $a$ suitable for waveguiding at wavelength $\lambda$, said tube consisting essentially of material of uniform index to provide guiding primarily within said bore,
  a gaseous active medium disposed at least partially within the bore of said capillary tube and having a transition capable of providing stimulated emission of radiation at wavelength $\lambda$,
  means for establishing a discharge through sai medium to invert the populations of the energy levels of said transition, and
  a resonator of length $b$ for which the Fresnel number $a/b^2\lambda$ is less than about 0.5, said resonator together with the tube and said discharge establishing means comprising an enclosure for said medium,
  the capillary tube having open ends, and
  the resonator and the discharge establishing means including
    a pair of reflective metallic members closing the ends of said tube, one of said members being partially transparent for the radiation of wavelength $\lambda$, and
    means for establishing a potential between the metallic members.

2. A gas laser comprising
  a capillary tube of bore diameter $a$ suitable for waveguiding a wavelength $\lambda$, said tube consisting essentially of material of uniform index to provide guiding primarily within said bore,
  a gaseous active medium disposed at least partially within the bore of said capillary tube and having a transition capable of providing stimulated emission of radiation at wavelength $\lambda$, means for establishing a discharge through said medium to invert the populations of the energy levels of said transistion, and a resonator of length b for which the Fresnel number $a/b^2\lambda$ is less than about 0.5, said resonator together with the tube and said discharge establishing means comprising an enclosure for said medium, the capillary tube comprising at least two flat dielectric plates and means including two dielectric films between said plates and in contact therewith for forming a rectangular tube bore between said plates.

3. A gas laser comprising a capillary tube of bore diameter $a$ suitable for waveguiding at wavelength $\lambda$, said tube consisting essentially of material of uniform index to provide guiding primarily within said bore, a gaseous active medium disposed at least partially within the bore of said capillary tube and having a transition capable of providing stimulated emission of radiation at wavelength $\lambda$, means for establishing a discharge through said medium to invert the populations of the energy levels of said transistion, and a resonator of length $b$ for which the Fresnel number $a/b^2\lambda$ is less than about 0.5, said resonator together with the tube and said discharge establishing means comprising an enclosure for said medium, the capillary tube having open ends, and the resonator comprising periodic variations in the guiding properties of said tube, said variations being distributed axially along said tube adjacent the bore throughout portions near said ends at a multiple of $\lambda/4$, the discharge establishing means comprising dielectric members forming bulbous enclosures over said ends of said tube, and a cathode and an anode penetrating respective ones of said dielectric members.

* * * * *